F. C. MILLER.
FRICTION INSERT FOR BRAKING SURFACES.
APPLICATION FILED DEC. 4, 1907.
914,594.
Patented Mar. 9, 1909.
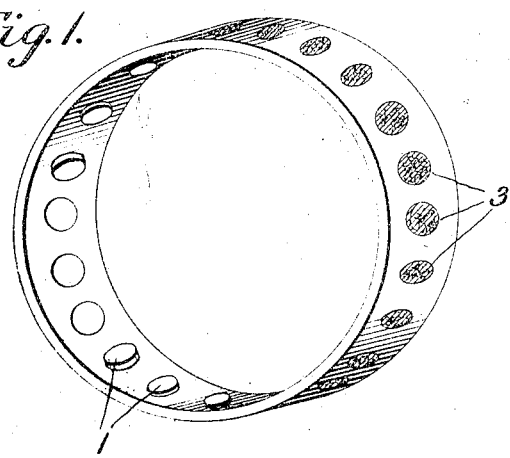
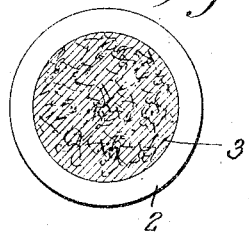
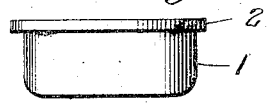
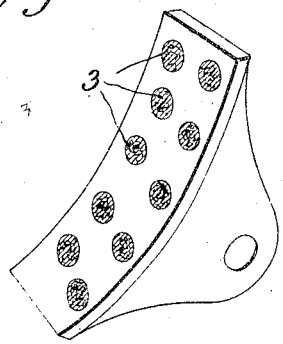
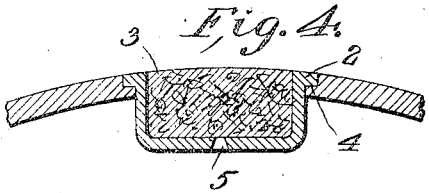
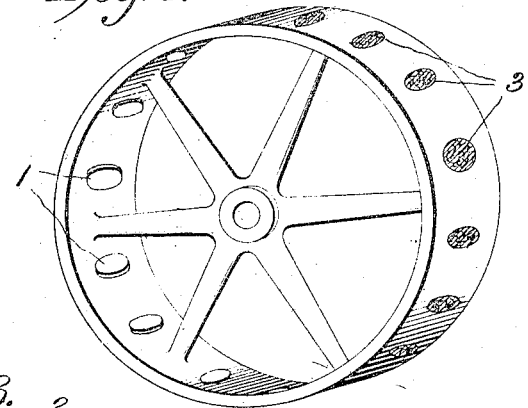
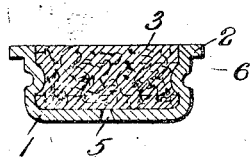
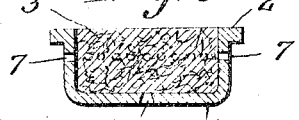
Witnesses
Jos. F. Collins.
J. M. Wynkoop
Inventor
Frederick C. Miller
By Knight Bros
Attorney

UNITED STATES PATENT OFFICE.

FREDERICK C. MILLER, OF CINCINNATI, OHIO.

FRICTION-INSERT FOR BRAKING-SURFACES.

No. 914,594.   Specification of Letters Patent.   Patented March 9, 1909.

Application filed December 4, 1907. Serial No. 405,045.

*To all whom it may concern:*

Be it known that I, FREDERICK C. MILLER, a citizen of the United States, and residing at Cincinnati, in the county of Hamilton and State of Ohio, have invented certain new and useful Improvements in Friction-Inserts for Braking-Surfaces, of which the following is a specification.

The object of my invention is to provide a friction surface for clutches, brakes, band pulleys, etc., that can be readily replaced without the aid of special tools; and with this and minor objects in view, my invention consists of the parts and combination of parts as will be more fully hereinafter set forth.

In the drawing, Figure 1 is a perspective view of a clutch ring with my invention in position; Fig. 2 is a top plan view of my invention detached; Fig. 3 is a side elevation of the same; Fig. 4 is a sectional view showing my invention in position in the rim of a pulley; Fig. 5 is a perspective view of a brake-shoe embodying my invention; Fig. 6 is a perspective view of a pulley embodying my invention; and Figs. 7 and 8 are sectional views of slightly modified forms of the cup embodied in my invention.

1 represents a cup having an annular flange 2 at the top thereof.

3 represents a piece of cork or any other suitable material for creating friction.

While I have illustrated the cup as being provided with the annular flange 2, it is, of course, obvious that this flange may be omitted without affecting the efficiency of the cup.

The braking surface of the clutch, brake-shoe or pulley is provided with a series of holes, which may or may not extend entirely through the shoe, clutch or pulley, as preferred by the manufacturer.

In carrying out my invention, cork or other material designed to create friction is inserted in the cup 1 by suitable machinery and securely compressed therein against accidental displacement. The friction insert thus completed is furnished to the trade as an article of manufacture.

I am aware that cork inserts have heretofore been used, but in using the same it is necessary to drill a hole in the braking surface and by special machinery insert the corks in said holes under great pressure. The cork is first soaked before being inserted. In this construction, it is absolutely necessary to send the part, whether it be a brake shoe, clutch or pulley, to the factory or have special tools for the purpose of making the repair in the event of an accident to one of the cork inserts.

By my invention the inserts are manufactured and sold to the trade, and inasmuch as the cork is firmly compressed in the cup, it is a simple matter for any one to insert the cups in place without special tools or difficulty. In the case of an automobile, these cups may be inserted with ease while on the road.

In the use of my invention, there is no limit to the depth of the cork that may be used, nor is any special thickness of clutch ring required.

In the use of the cork inserts, which I have admitted to be broadly old, it has been found that said inserts cannot be used where the clutch ring is very thin; whereas, as above stated, the use of my invention is not limited to any particular thickness of the clutch ring, inasmuch as the depth of the cup may be just as great when used with a thin clutch ring as when used with a thick one. While the cups are firmly secured in the holes in the braking surface, it is, of course, understood that they are detachably secured. The holes in the braking surface are provided with a shoulder 4, on which the annular flange 2 is seated.

In order that the air may escape from the cup while the cork is being driven in, I provide an opening or port 5 in the bottom thereof.

In the modified form of cup shown in Fig. 7, the cup is shown as provided with a bead 6 which is spun around the holder inwardly and adapted to project into the cork thereby preventing the cork from being accidentally displaced.

I have shown the cup in Fig. 8 as being provided with a series of perforations 7 in the walls thereof into which the cork is pressed while it is being compressed within the cup. The portions of the cork pressed into said perforations form a series of anchoring lugs or projections.

Having thus described my invention, what I claim as new and desire to secure by Letters Patent is:

1. A friction insert comprising a cup-shaped holder adapted to be inserted into a braking element normal to its braking surface and to be held therein by friction; and a suitable friction material embedded in said holder.

2. The combination with a braking surface provided with an annular recess normal to said surface; of a friction insert comprising a cylindrical holder with an annular flange at the top whereby said holder is adapted to be seated in said recess, and a friction material filling said holder.

3. The combination with a braking surface provided with a series of annularly-recessed holes; of friction inserts constructed to be forced into said holes normally to the braking surface, each of said inserts comprising a flanged cup-shaped holder and cork secured in said holder.

4. The combination with a braking surface provided with a series of cylindrical holes with shoulders therein near the mouths of said holes, of a cylindrical holder constructed to be forced into said holes, an annular flange at the top of the holder constructed to engage said shoulder to limit the inward movement of the holder, and cork secured in said holder as a frictional contact for the braking surface.

5. As an article of manufacture, a cylindrical holder for friction material, closed at one end and open at the other, said insert being provided at its open end with an outwardly extending flange transverse to the axis of the insert to limit the depth to which it may be introduced into a friction element, an inwardly projecting annular bead for retaining the friction material therein, and a hole in the closed end to permit the escape of air when the friction material is introduced.

The foregoing specification signed at Newport Ky. this 16th day of October, 1907.

FREDERICK C. MILLER.

In presence of two witnesses
A. M. LARKIN,
J. P. WECKMAN.